SYSTEM FOR THE TRANSMISSION OF TELEGRAPH SIGNS ON A RADIO PATH BY MEANS OF A DOUBLE WAVE

Filed Jan. 15, 1948

INVENTOR.
Hendrik C. A. van Duuren
BY Brown, Jackson, Boettcher & Dienner
Attorneys Patented May 8, 1951

2,552,126

UNITED STATES PATENT OFFICE 2,552,126

SYSTEM FOR THE TRANSMISSION OF TELEGRAPH SIGNS ON A RADIO PATH BY MEANS OF A DOUBLE WAVE

Hendrik C. A. van Duuren,
Wassenaar, Netherlands

Application January 15, 1948, Serial No. 2,438
In the Netherlands October 24, 1946

Section 1, Public Law 690, August 8, 1946
Patent expires October 24, 1966

9 Claims. (Cl. 250—8)

Figures 2, 3:
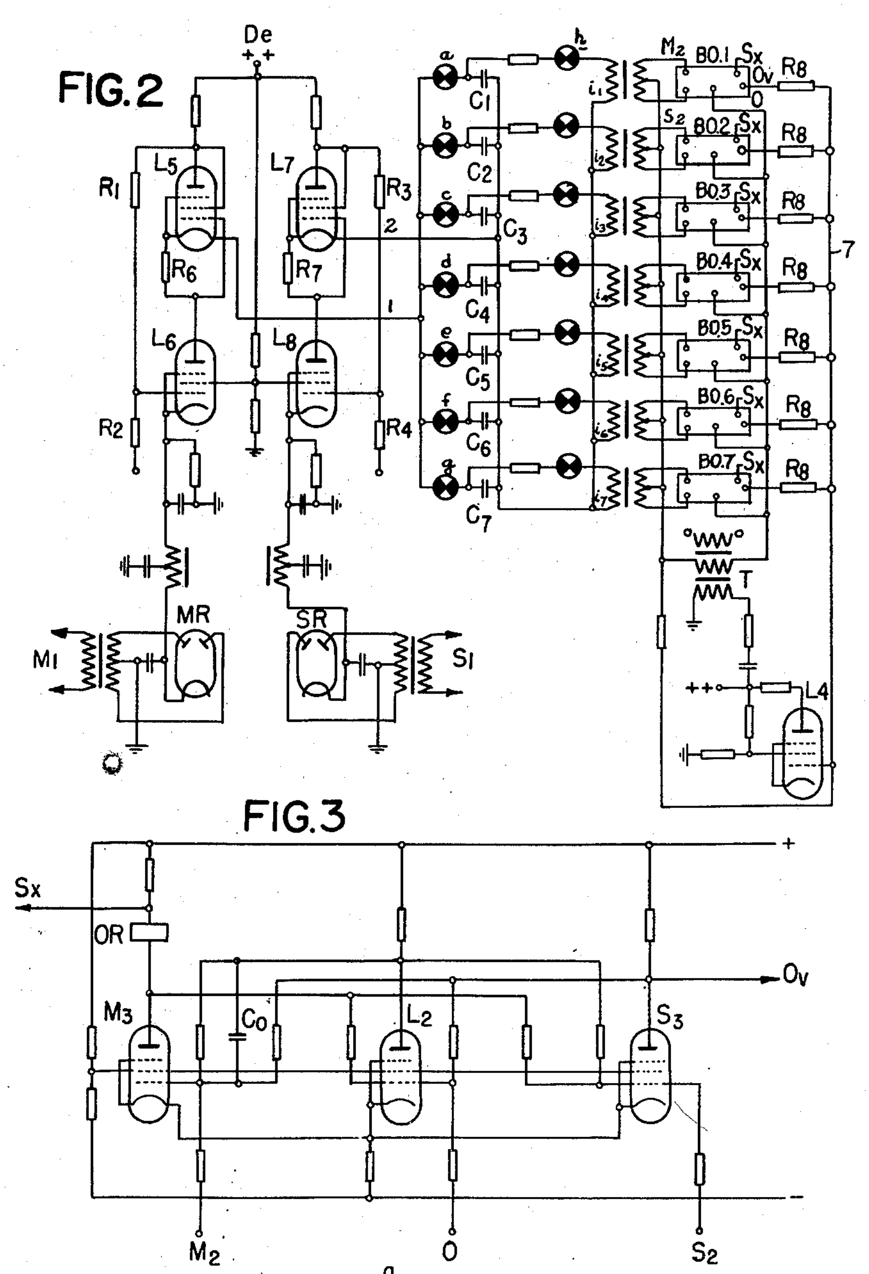

The invention relates to an improved radio telegraph system embodying apparatus for protecting the system against disturbances in the transmission channel, and more particularly, the invention relates to such systems wherein the signal elements are periodically transmitted by means of dual frequencies, as, for example, by transmitting the marking elements of the signals on one frequency and transmitting the spacing elements of the signals on another frequency.

One of the features of the invention is an improved receiver which converts the dual frequency signal elements into dual current signal elements, and which exerts a blocking action such that the receiver keeps on supplying marking or spacing current, as the case may be, until the signal ceases over the corresponding marking or spacing frequency of the radio link, irrespective of any signals that may be received over the other frequency during reception of that signal. Systems of this general dual frequency type are old and well known, as exemplified by United States Patents Nos. 1,888,280 and 1,795,393.

In the system of the present invention, a code is used wherein the signals consist of $m$ elements, of which $n$ elements are marking elements, while the remainder of $m—n$ elements are spacing elements, such code being known per se, as, for example, in Dutch Patent No. 53,727.

One of the features of the invention is that the telegraphic receiver or transmitter responds to the marking elements, and that a signal is designated as disturbed only when it has more than $n$ marking elements, or when the number of marking elements differs from $n$, even after their incomplete number has been supplemented with those signal elements for which neither a marking nor a spacing element is being recorded, such supplementing being effected only if the number of spacing elements received equals $m—n$.

The invention is based on the assumption that should a given number of spacing elements be lost in transmission, it is unlikely that a correct number of spacing elements will be obtained as a result of the conversion by the atmospheric conditions of a corresponding number of marking elements into spacing elements; so that it may be assumed that whenever the number of spacing elements is correct, any missing elements must have been marking elements. The invention affords the possibility of regarding the signal in such case as being undisturbed, and printing this probably-correct signal.

As is customary in systems provided with protection against disturbances, each signal consists of a variation of a constant number of elements wherein the ratio between marking and spacing elements is constant. In the example hereinafter described, this ratio is 3:4. In the preferred mode of operation of the invention, a disturbance warning is given only upon a deviation from the fixed ratio of 3:4. The transmission over dual frequencies is employed only to obtain a radio link which in itself is as free from disturbances as possible. It will be obvious that the complete signal may be derived from the marking frequency or from the spacing frequency exclusively, i. e. all of the elements of a complete signal may be marking elements, or all of the elements may be spacing elements.

In my improved receiver, the marking element frequency and the spacing element frequency are first fed to a demodulating network which performs the aforesaid blocking function. For example, whenever marking signal current is being received the demodulating network will continue to supply marking current until the marking signal ceases over that radio channel frequency devoted to marking elements, and the demodulating network will block any signals that may be received over that radio channel frequency devoted to spacing elements. Conversely, when the receiver is receiving spacing signal elements over that radio channel frequency devoted to the transmission of such elements, the demodulating network will block the transmission of marking elements over the other radio channel frequency devoted to the transmission of marking elements.

Integrating devices, preferably in the form of condensers or capacitors, are arranged to be successively connected to the output end of the demodulating network by means of distributor contacts, and these integrating devices are then connected through further distributor contacts to a series of control devices for the receiver relays. These control devices are preferably equal in number to the integrating condensers, and each is adapted to assume any one of three conditions, depending upon whether the integrating condenser associated with that control device is positively charged, uncharged, or negatively charged. These three conditions will be designated as the marking charged condition, the uncharged condition and the spacing charged condition. Now assuming, for example, that each signal consists of seven elements or units, of which three must be marking elements and four must be spacing elements, the reconstruction of a mutilated received signal, or the determination of a signal as "disturbed," according to the invention proceeds as follows.

If after a scanning operation consisting of scanning all seven elements or units of a single signal, three of the aforesaid control devices are in the marking charged condition, then the signal is passed on to the telewriter, possibly after conversion into a five-unit signal. If, however, less than three control devices are in the marking charged condition, then there still is a possibility that the one or more control devices which failed to assume this marking charged condition may have remained in the no charge condition.

After scanning the seven elements of a seven element signal, it will be clear that each of the seven control devices should either be in the marking charged condition or in the spacing charged condition; from which it follows that the no-charge condition can exist only due to a disturbance. If less than three control devices are in marking charged conditions at the conclusion of a scanning operation, then this fact is the result of a disturbance or multilation, which however, is not likely to be of such a nature that the particular control device which failed to assume the marking charge condition would necessarily faultily assume the spacing charged condition.

There is a greater chance that any one control device which has failed to assume a marking charge condition has remained in an uncharged condition, such being the condition of all of the control devices at the start of the scanning operation. This fact or probability is utilized according to the invention by investigating, after ascertaining that an incomplete number of control devices have assumed marking charged conditions, and at least the correct number or more of the control devices have assumed the spacing charged conditions, whether the number of marking charged conditions will meet the requirements upon the addition of the uncharged conditions thereto.

Figure 1:
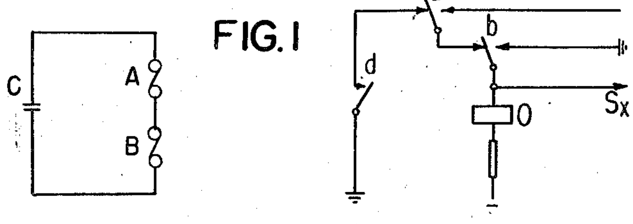

Referring now to certain preferred embodiments of my invention and preferred methods of carrying the same into effect:

Figure 1 is a schematic or illustrative circuit diagram of one embodiment showing the principle of my invention;

Figure 2 is a more complete diagram of another embodiment of the invention showing all of the circuits and apparatus of the receiver to which the present invention pertains, and Figure 3 is a circuit diagram of one of the seven control devices utilized in the embodiment of Figure 2 for responding to the marking charged condition, spacing charged condition, or uncharged condition, as pointed out above.

Referring first to the circuit relations shown in Figure 1, this figure shows the circuit at a moment when one of the integrating condensers C is discharged over polarized relays A and B, whose armature *a* and *b* respectively have been brought into the positions illustrated in the right hand portion of Figure 1. These positions are such that with a positive charge at integrating condenser C, the armature *b* will be shifted, and with a negative charge at integrating condenser C the armature *a* will be shifted. In the first instance, the armature *a* will remain in its position, and in the second instance the armature *b* will remain in its position. Therefore, the position shown in the drawing is the uncharged position; the first named position is the marking charged position; and the last named position is the spacing charged position.

In the marking charged position the associated relay O responds. If upon the completion of the scanning operation of scanning all of the elements of one signal or letter, less than three of these relays O are energized, then a signalling device comes into operation which closes the contact *d*. This contact *d* now adds the uncharged positions if the number of spacing charged positions is four or more. There is always a good chance that none of the uncharged positions or conditions is the result of disturbances, such as fading, in the spacing wave. This would be possible only under the conditions that if simultaneously with the fading in the wave, one or more "extras" should occur, which would be an extremely rare coincidence. A signal that is faultless with regard to the marking current elements is one which has three (or *n*) marking elements. Furthermore, a signal is supplemented to make up a complete seven (or *m*) unit signal when it is also faultless with regard to the spacing current elements (i. e. when four or *m*—*n* spacing elements are received), and some of the remaining *n* relays O (Figure 1) have remained in the inoperative positions in which they were at the start of the scanning operation.

Referring to Figure 2, the left hand network comprising the electron tubes $L_5$, $L_6$, $L_7$ and $L_8$ constitutes a demodulator for the marking element frequency and the spacing element frequency, which demodulator is characterized by the above described blocking action. The input circuits and associated rectifiers for the marking frequency and for the spacing frequency are indicated at the lower part of Figure 2 by the reference characters M1 and S1, respectively. Assume, for example, that a marking signal is being received over the input circuit M1; the left hand rectifier MR associated with this input renders the lower left hand electron tube $L_6$ conductive, whereby a current flows up through the anode circuit of this tube and through resistance $R_6$ and conductor 1 to one of the distributor contacts *a* to *g*, inclusive. These seven distributor contacts *a* to *g*, inclusive, operate in timed sequence synchronously with the timed reception of the seven elements of a seven unit code signal. Connected to each of these distributor contacts *a*—*g* is an individual integrating condenser or capacitor $C_1$ to $C_7$, inclusive. Hence the above described current flowing over conductor 1 will pass through the particular distributor contact which is then closed, and will charge the integrating condenser which is associated with that contact. The voltage drop caused by this current across resistance $R_6$ imparts to the upper left hand tube $L_5$ a grid potential such that the tube is blocked and cannot pass any current. Thus the aforementioned current flow from the anode of tube $L_6$ is blocked from passing upwardly through the upper tube $L_5$. From the other side of the integrating condenser $C_1$—$C_7$ the current continues over conductor 2 and upwardly through the anode circuit of the upper right hand tube $L_7$ to battery De. This current flowing through the tube $L_7$ causes the anode thereof to become more negative, so that through the resistance $R_3$ and $R_4$ the control grid potential of the lower right hand tube $L_8$ becomes so much more negative that this tube is also blocked so that it can no longer pass any current. Thus, this lower right hand tube $L_8$ is performing a blocking function so as to prevent any faulty signals or disturbances from passing upwardly through the spacing frequency input S1 during the time that the marking frequency input M1 is engaged in transmitting marking elements up through the demodulating network. Thus, the incidents of modulations at spacing signal frequency arriving at input S1 cannot function to make the lower right hand tube $L_8$ conductive until after the modulations at marking signal frequency entering at input M1 have completely ceased. It will be understood that the converse of this is also true. Spacing signal frequencies arriving at input S1 function through the right hand rectifier SR to render the lower right hand tube $L_8$ conductive, whereby a current flows through the resistance $R_7$ and conductor 2 to the opposite side of one of the integrating condensers $C_1$—$C_7$. This particular condenser is selected by the distributor contacts *a* to *g* inclusive. The circuit then continues through this distributor contact, conductor 1 and anode circuit of the upper left hand tube $L_5$ to battery De. At this same time, the voltage drop caused by the current flow through resistance $R_7$ imparts to the control grid of tube $L_7$ a potential such that the tube blocks current flow upwardly through its anode circuit. Similarly, the current flowing through the tube $L_5$ causes the anode thereof to become more negative, so that through the resistances $R_1$ and $R_2$ the control grid potential of the lower left hand tube $L_6$ becomes so much more negative that this tube can no longer pass any current. Hence this lower tube functions as a blocking tube to prevent the entrance of marking signal frequencies to the demodulator network from the marking signal input M1.

After the lapse of the time interval determined for the signal element in question, the operation of the next distributing contact *a* to *g* serves to connect the next succeeding one of the integrating condensers $C_1$ to $C_7$ to the output end of the demodulator network. After all of the integrating condensers $C_1$ to $C_7$ have been successively included in the output circuit of the modulator network to receive charges corresponding to the seven elements of the seven unit code signal, these seven integrating condensers are all simultaneously discharged into the primaries of seven transformers designated $i_1$ to $i_7$, inclusive. This simultaneous discharge of the seven condensers is effected through the seven simultaneously actuating rotary or distributor contacts *h*. The secondary end terminals of these seven transformers are connected to marking and spacing terminals M2 and S2 (Figure 3) of the seven control devices designated $BO_1$ to $BO_7$ in Figure 2.

Figure 3 illustrates the constituent elements and circuit connections of each of these control devices. As shown in such figure, each of these control devices has its above described input terminals $M_2$ and $S_2$ connected respectively to the control grids of electron tubes $M_3$ and $S_3$. In addition, each control device has a third input terminal O connected to a third tube $L_2$ which exercises a triggering or control function over the marking tube $M_3$. Each control device $BO_1$ to $BO_7$ also has output terminals $O_v$ and $S_x$ in addition to the current supply terminals + and —. The output terminals $O_v$ of the seven control devices are each connected through an individual resistor $R_8$ to a grid control conductor 7 leading to the control grid of space counting tube $L_4$.

The anode circuit of this space counting tube L is connected to a primary winding of control transformer T. The other output terminals $S_x$ extend to a fault signalling device, to be later described. The secondaries of the seven transformers $i_1$ to $i_7$ are connected between the terminals $M_2$ and $S_2$ of these control devices $BO_1$—$BO_7$ in such manner that either $M_2$ or $S_2$ will become positive, depending upon whether a positively charged or a negatively charged integrating condenser $C_1$ to $C_7$ is being discharged across the corresponding primary winding of that transformer. Referring to the other input terminal O of each control device (Figure 2), these input terminals of all seven control devices are connected in multiple to the secondary winding of control transformer T for rendering each of these tubes simultaneously conductive responsive to a signal received over the transformer primary O—O.

In each control device, the marking tube $M_3$ and the spacing tube $S_3$ are connected to the trigger control tube $L_2$ in a circuit which has a unique change-over or see-saw action. A distinctive feature of this circuit is the interposition of condenser $C_0$ between the anode of this trigger control tube $L_2$ and the control grid of the marking tube $M_3$, so that when the control tube $L_2$ becomes dead the marking tube $M_3$ becomes conductive but not the spacing tube $S_3$. Thus, under the conditions of the signal having four or more spacing elements, as hereinafter described, there is a cessation of current flow through the space counting tube $L_4$, which causes a negative impulse to be transmitted through transformer T to the O terminals of all of the control devices $BO_1$ to $BO_7$. This negative impulse causes the trigger control tubes $L_2$ (which were still passing current) to become non-conductive. The action of the condenser $C_0$ interposed between the anode of control tube $L_2$ and the control grid of marking tube $M_3$ in each of these control devices is to cause the marking tube $M_3$ to become conductive when the control tube $L_2$ becomes dead, this being a selective operation, however, because the control tube $L_2$ does not exercise a like control over the spacing tube $S_3$ at this time.

The operation of each of these control devices is as follows: Upon receiving a marking element at terminal $M_2$ of the control device, the marking tube $M_3$ becomes conductive and this makes trigger tube $L_2$ non-conductive. Upon receiving a spacing element at terminal $S_2$ of the control device, the spacing tube $S_3$ becomes conductive and this makes trigger tube $L_2$ non-conductive. If the corresponding integrating condenser $C_1$—$C_7$ associated with that control device was not charged in the operation of integrating the elements of the signal, due, for example, to some disturbance on the radio channel or link, then marking tube $M_3$ and spacing tube $S_3$ remain non-conductive and intermediate control tube $L_2$ remains conductive. Whenever there are four or more spacing tubes $S_3$ in a conductive state in four or more of these control devices at the end of the scanning operation, corresponding to the presence of four or more spacing elements in the scanned signal, these four or more current conducting tubes lower the potential in the control conductor 7, which leads to the control grid of space counting tube $L_4$. This lowering of the potential occurs at the junction point of the resistances $R_8$ connected between this grid control conductor 7 and the output terminals Ov of the control devices. When four or more of these space tubes $S_3$ have become conductive at the end of the scanning operation, the potential applied to the control grid of the space counting tube $L_4$ is lowered to such an extent that this tube becomes non-conductive, and the tube then applies a negative impulse through the transformer T to the input terminals O of the seven control devices. This negative impulse acting on input terminals O makes the still conductive control tubes $L_2$ non-conductive, with the result that the marking tubes $M_3$ controlled thereby become conductive through the condensers $C_0$. With regard to those four control devices in which the spacing tubes $S_3$ have been made conductive by the "spacing" polarity of discharge of their respective condensers $C_1$—$C_7$, the placing of these four tubes in a conductive state has placed their associated control tubes $L_2$ in a non-conductive state, and hence the negative impulse from transformer T does not affect these four control devices. However, with regard to the other three control devices, if the control tubes $L_2$ of any of these devices are still conductive, this negative impulse makes such control tubes non-conductive, so that they in turn make their marking tubes $M_3$ conductive through condensers $C_0$, thereby setting up the status of three marking elements in the signal.

It will be seen from the foregoing that the operation of this embodiment shown in Figures 2 and 3 largely agrees with that described above in connection with Figure 1. The circuit including the three tubes $M_3$, $S_3$ and $L_2$ of Figure 2 corresponds substantially to the circuit including the series connected relays A and B of Figure 1; also the receiver relay OR of Figure 3 corresponds substantially to the relay O of Figure 1. The output terminals $S_x$ are connected to a fault-signalling device, which device becomes operative whenever, at the conclusion of the scanning or integrating operation, the number of relays OR which are energized in the seven control devices differs from three, i. e. differs from three marking elements in that signal.

While I have illustrated and described what I regard to be the preferred embodiments of my invention, nevertheless it will be understood that such are merely exemplary and that numerous modifications and rearrangements may be made therein without departing from the essence of the invention.

I claim:

1. In a radio telegraph system wherein the marking elements and the spacing elements of the signals are transmitted over the radio link on different frequencies, the combination of receiving apparatus comprising a demodulator operative to block the reception of spacing elements when marking elements are being received, and vice versa, integrating condensers adapted to store the marking and spacing elements of the received signal, means for determining whether the received signal has its predetermined proportion of spacing elements, and means responsive thereto for supplementing the received signal for making up the predetermined proportion of marking elements in the event such signal is deficient in marking elements.

2. In a radio telegraph system wherein the signals transmitted are multiple unit fixed-ratio signals comprising a predetermined number of marking elements transmitted over the radio path on one frequency and a predetermined number of spacing elements transmitted over the radio path on another frequency, the combination in a receiver for such signals, of signal scanning apparatus comprising a plurality of integrating condensers, one for each signal element of the complete signal, means responsive to the reception of each signal for storing different charges in said condensers corresponding to the marking or spacing identity of their respective signal elements, a control device individual to each condenser, each control device comprising a marking charge electron tube, a spacing charge electron tube and a control electron tube, means for discharging said integrating condensers into said control devices for selectively rendering the marking charge tube or the spacing charge tube of each control device conductive depending upon the charge received from its associated condenser, said marking charge tube and said spacing charge tube remaining temporarily non-conductive if the associated condenser has no stored charge to transmit owing to a transmission disturbance occurring at that element of the signal, a space adding tube operatively connected with said integrating condensers for determining if four of the signal elements of the scanned signal are space elements, means responsive to said space adding tube for transmitting a control pulse to said control tubes if four of the signal elements are space elements, means responsive to the reception of said control impulse at the control devices which have not received any charges from their integrating condensers for causing said control devices to assume a condition corresponding to the reception of marking charges, and output terminals at said control devices for connection to a fault signalling device.

3. In a radio telegraph system wherein the signals transmitted are seven unit fixed-ratio code signals comprising three marking elements transmitted over the radio path on one frequency and four spacing elements transmitted over the radio path on another frequency, the combination in a receiver for said signals, of signal scanning apparatus comprising seven integrating condensers, one for each signal element of the complete signal, means responsive to the reception of each signal for storing different charges in said condensers corresponding to the marking or spacing identity of their respective signal elements, seven control devices, one individual to each integrating condenser, each control device comprising a marking charge electron tube, a spacing charge electron tube and a control electron tube, said marking charge tube and said spacing charge tube normally being non-conductive at the start of each signal integrating operation, means for simultaneously discharging said integrating condensers into said control devices for selectively rendering the marking charge tube or the spacing charge tube of each control device conductive depending upon the charge received from its associated condenser, said marking charge tube and said spacing charge tube remaining temporarily non-conductive if the associated condenser has no stored charge to transmit owing to a transmission disturbance occurring at that element of the signal, a totalizing tube for adding the spacing charges received by said integrating condensers, a grid control circuit from said integrating condensers to the control grid of said totalizing tube for causing said totalizing tube to become non-conductive if four of said integrating condensers have received spacing charges, a control transformer for transmitting a control impulse to said control tubes when said totalizing tube becomes non-conductive, means responsive to the reception of said control impulse at those control devices which have not received any charges from their integrating condensers for causing the control tubes thereof to become non-conductive, means responsive to said latter control tubes becoming non-conductive for causing the associated marking charge electron tube of that control device to become conductive, and output terminals responsive to the marking charge electron tubes of said control devices for connection to a fault-signalling device.

4. In a radio telegraph system wherein the signals transmitted are seven unit fixed-ratio code signals comprising three marking elements transmitted over the radio path on one frequency and four spacing elements transmitted over the radio path on another frequency, the combination in a receiver for said signals, of signal scanning apparatus comprising seven integrating condensers, one for each signal element of the complete signal, means responsive to the reception of each signal for storing different charges in said condensers corresponding to the marking or spacing identity of their respective signal elements, seven control devices, one individual to each integrating condenser, each control device comprising a marking charge electron tube, a spacing charge electron tube, a control electron tube, a change-over or see-saw circuit connecting said tubes including a condenser between the anode of said control tube and the grid of said marking charge tube, whereby when the marking charge or spacing charge tubes are rendered conductive said control tube is rendered non-conductive, and whereby when the control tube is rendered non-conductive the marking charge tube is rendered conductive but not the spacing charge tube, means for simultaneously discharging said integrating condensers into said control devices for selectively rendering the marking charge tube or the spacing charge tube of each control device conductive depending upon the charge received from its associated condenser, said marking charge tube and said spacing charge tube remaining temporarily non-conductive if the associated condenser has no stored charge to transmit owing to a transmission disturbance occurring at that element of the signal, a totalizing tube for adding the spacing charges received by said integrating condensers, a grid control circuit from said integrating condensers to the control grid of said totalizing tube for causing said totalizing tube to become non-conductive if four of said integrating condensers have received spacing charges, a control transformer for transmitting a control impulse to said control tubes when said totalizing tube becomes non-conductive, means responsive to the reception of said control impulse at those control devices which have not received any charges from their integrating condensers for causing the control tubes thereof to become non-conductive, means responsive to said latter control tubes becoming non-conductive for causing the associated marking charge electron tube of that control device to become conductive, and output terminals responsive to the marking charge electron tubes of said control devices for connection to a fault-signalling device.

5. In a radio telegraph system wherein the signals transmitted are multiple unit fixed-ratio signals comprising a predetermined number of marking elements transmitted over the radio path on one frequency and a predetermined number of spacing elements transmitted over the radio path on another frequency, the combination in a receiver for such signals, of a marking input circuit for receiving the marking elements, a spacing input circuit for receiving the spacing elements, integrating condensers for receiving said signal elements from both of said input circuits, blocking means operative during the reception of marking elements over said marking input circuit for preventing the transmission of spacing elements to said condensers over said spacing input circuit, and operative during the reception of spacing elements over said spacing input circuit for preventing the transmission of marking elements to said condensers over said marking input circuit, and means responsive to the charges on said integrating condensers for supplementing the received signal with signal elements of one class when the received signal has the required number of signal elements of the other class.

6. In a radio telegraph system wherein the signals transmitted are multiple unit fixed-ratio signals comprising a predetermined number of marking elements transmitted over the radio path on one frequency and a predetermined number of spacing elements transmitted over the radio path on another frequency, the combination in a receiver for said signals, of a marking input circuit for the marking elements, a spacing input circuit for the spacing elements, a demodulating network comprising amplifying and blocking tubes in both of said input circuits, integrating condensers adapted to receive the marking and spacing elements from both of said input circuits, distributing contactors interposed between said demodulating network and said integrating condensers for successively distributing the signal elements of each signal to successive integrating condensers, circuit connections in said network operative during the reception of marking elements over said marking input circuit for causing one of said tubes to block the input transmission of spacing elements over said spacing input circuit, and operative during the reception of spacing elements over said spacing input circuit for causing another of said tubes to block the transmission of marking elements over said marking input circuit, a control device associated with each integrating condenser, each of said control devices comprising a marking charge electron tube, a spacing charge electron tube and a control electron tube, contactors for simultaneously discharging said integrating condensers to the marking charge electron tubes and spacing charge electron tubes of said control devices, means for predetermining if a certain number of said electron tubes of one class have received charges from their associated condensers, and means responsive to said latter means for thereupon placing the other electron tubes of the other control devices in a condition corresponding to the reception of opposite charges from their respective condensers.

7. In a radio telegraph system wherein the transmitted signals have a fixed total number of elements made up of a predetermined number of signal elements of one class and a predetermined number of signal elements of another class, the combination therewith of receiving apparatus comprising scanning means for determining whether the received signal has its predetermined number of signal elements of one class, means for registering the class of each of the elements of the received signal and for noting the particular elements for which class determination is precluded following disturbance in transmission and signal generating means controlled to operate by said scanning means only in the event that a signal has such predetermined number of elements of said other class, for supplementing the elements of the received signal which were indicated as having been disturbed in transmission with signal elements of the other class.

8. In a radio telegraph system wherein the transmitted signals have a fixed total number of elements made up of a predetermined number of marking elements and a predetermined number of spacing elements, the combination of receiving apparatus comprising means for determining whether the received signal has its predetermined number of spacing elements and the elements of said signal which appear disturbed, and means responsive thereto operative to supplement marking elements in the received signal for the apparently disturbed elements to make up marking elements lost in transmission disturbances.

9. In a radio telegraph system wherein the transmitted signals each consist of seven elements made up of three marking elements and four spacing elements maintained in fixed ratio, the combination of receiving apparatus comprising means for determining whether the received signal has its predetermined number of four spacing elements and indicating the elements which appear disturbed by transmission, and means responsive thereto operative to supplement marking elements in the received signal for the elements indicated as disturbed for making up a deficiency of marking elements in this signal when the signal contains four or more spacing elements.

HENDRIK C. A. VAN DUUREN.

REFERENCES CITED

The following references are of record in the file of this patent:

UNITED STATES PATENTS

| Number | Name | Date |
|---|---|---|
| 1,998,792 | Sedlmayer | Apr. 23, 1934 |
| 2,023,446 | Schroeter | Dec. 10, 1935 |
| 2,052,677 | Thompson et al. | Sept. 1, 1936 |
| 2,153,737 | Spencer | Apr. 11, 1939 |
| 2,183,147 | Moore et al. | Dec. 12, 1939 |
| 2,293,708 | Brown | Aug. 25, 1942 |
| 2,304,120 | Potts | Dec. 8, 1942 |
| 2,366,434 | Brown | Jan. 2, 1945 |
| 2,404,307 | Whitaker | July 16, 1946 |
| 2,453,659 | Bellescize | Nov. 9, 1948 |